United States Patent
Sinha et al.

(10) Patent No.: US 10,552,996 B2
(45) Date of Patent: Feb. 4, 2020

(54) SYSTEMS AND TECHNIQUES FOR DETERMINING ASSOCIATIONS BETWEEN MULTIPLE TYPES OF DATA IN LARGE DATA SETS

(71) Applicant: Adobe Inc., San Jose, CA (US)

(72) Inventors: Ritwik Sinha, Kolkata (IN); Said Kobeissi, Lovettsville, VA (US); Michael Young, Sterling, VA (US)

(73) Assignee: Adobe Inc., San Jose, CA (US)

( * ) Notice: Subject to any disclaimer, the term of this patent is extended or adjusted under 35 U.S.C. 154(b) by 641 days.

(21) Appl. No.: 15/085,210

(22) Filed: Mar. 30, 2016

(65) Prior Publication Data
US 2017/0288989 A1    Oct. 5, 2017

(51) Int. Cl.
G06F 15/16    (2006.01)
G06T 11/20    (2006.01)
G06F 16/35    (2019.01)

(52) U.S. Cl.
CPC ............ *G06T 11/206* (2013.01); *G06F 16/35* (2019.01)

(58) Field of Classification Search
CPC .................. G06F 17/30705; G06T 11/206
USPC .................................................. 709/203–248
See application file for complete search history.

(56) References Cited

U.S. PATENT DOCUMENTS

| | | | | |
|---|---|---|---|---|
| 6,560,647 B1 * | 5/2003 | Hafez | ................ | H04L 41/0893 709/223 |
| 7,165,105 B2 * | 1/2007 | Reiner | .................... | G06F 11/32 707/999.007 |
| 8,250,473 B1 * | 8/2012 | Haynes | .............. | G06Q 30/0201 709/224 |
| 9,299,173 B2 * | 3/2016 | Rope | ...................... | G06T 11/206 |
| 9,390,240 B1 * | 7/2016 | Brisebois | ................ | G06F 21/31 |
| 9,424,318 B2 * | 8/2016 | Anand | .............. | G06F 16/24578 |
| 2006/0005121 A1 * | 1/2006 | Berger | .................. | G06F 16/283 715/230 |

(Continued)

OTHER PUBLICATIONS

Zhang et al., Visual Correlation Analysis of Numerical and Categorical Data on the Correlation Map, IEEE Transactions on Visualization and Computer Graphics, vol. 21, No. 2, Feb. 2015, pp. 289-303.*

(Continued)

*Primary Examiner* — Moustafa M Meky
*Assistant Examiner* — Thorne E Waugh
(74) *Attorney, Agent, or Firm* — Kilpatrick Townsend & Stockton LLP

(57) ABSTRACT

Systems and methods disclosed herein identify multivariate relationships that exist across all types data collected from numerous observed users over one or more networks. Electronic data collected from observed users include categorical data and non-categorical/numeric data. To compare and analyze the collected data, a marketing entity converts the numeric data to categorical data via a binning algorithm, which reduces the numeric data into two or more discrete categories. The marketing entity analyzes the data variables to compute pairwise associations on the collected categorical and numeric data (which has been converted to categorical data). The marketing entity also determines hierarchical clusters to group the pairwise associations of data variables based on the strength of the associations. The pairwise relationships and hierarchical clusters are displayed on a user interface.

19 Claims, 10 Drawing Sheets

(56) References Cited

U.S. PATENT DOCUMENTS

2015/0358391 A1* 12/2015 Moon .................. H04L 67/10
709/224

OTHER PUBLICATIONS

McCaffrey, James, Test Run—Converting Numeric Data to Categorical Data, Aug. 2013, pp. 1-15. (Year: 2013).*
Kateja et al., "VizClick Visualizing Clickstream Data," Proceedings of the 5$^{th}$ International Conference on Information Visualization Theory and Applications (VAAP-2014), pp. 247-255.

* cited by examiner

SYSTEMS AND TECHNIQUES FOR DETERMINING ASSOCIATIONS BETWEEN MULTIPLE TYPES OF DATA IN LARGE DATA SETS

TECHNICAL FIELD

This disclosure relates generally to computer-implemented methods and systems for determining associations and relevancy groupings in large analytics data sets.

BACKGROUND

Electronic data management products provide marketing entities a centralized system for gathering and analyzing diverse types of electronic data on Internet analytics collected on observed users. The electronic data can aid the marketing entity in providing personalized marketing communications for individual users. For example, a marketing entity (which can include entities such as advertisers, marketers, or other agencies) frequently receives information on network actions taken by one or more observed users. The electronic data that is received by the marketing entities encompasses diverse types of marketing data and other data. For example, marketing entities collect data on visits and interactions by observed users on a website, digital advertising data, website personalization data, geographic and demographic data of observed users, among other electronic data. Marketing entities further receive electronic data via multiple sources, such as mobile and desktop computing devices, smart devices connected to the Internet, and other sources. Receiving diverse types of data across millions of observed users can greatly enhance the distribution and targeting of electronic communication by more precisely defining the interests of the observed users and thus provide a better user experience for the end users. However, the electronic nature of the data collection creates hurdles unique to the network environment in which they are used. Specifically, with this growth of big data, there is an increased need to determine relationships between sets of collected data and present the relevancy of the tracked data. Because the size and structure of the data is large and complex, determining and presenting the relationships and relevancy of the data presents unique challenges. Further compounding the problems inherent in large and complex data sets is that the data is increasingly being stored across multiple storage units in a distributed computing environment.

Consider the example of web sites. Many web sites are large and complex in nature and provide multiple functionalities, such as allowing users to find information, engage in commerce, socialize, or other functionalities. Such web sites have thousands or even more of unique web pages and are visited every day by millions or even more of users dispersed through geographic locations worldwide with various demographics. A marketing entity needs to receive information on traffic patterns associated with the visits of the users to each web site or group of websites. For example, analytics data collected from user interactions with groups of websites include numeric data points having an unlimited number of different potential values and categorical (e.g., non-numeric) data points having a discrete set of limited values. Examples of numeric data points include duration of time of a web site visit, revenue generated per visit, age of observed user, etc. Examples of categorical/non-numeric data points include geographical location of the observed user, occupation of observed user, and other information that is not otherwise ordered. Prior efforts to determine the relationships between individual data fields and analyze the global structure of the data of various types has been limited. The various data variables on the observed users are stored across multiple storage units and processed by multiple distributed processing units. There is a need for determining and presenting the relationships and relevancy of large sets of data variables.

SUMMARY

Systems and methods disclosed herein determine associations and groupings of strongly correlated data sets for multiple data types collected from various sources. A marketing entity receives large amounts of electronic categorical data from multiple observed users. Categorical data includes non-numeric data such as the geographic locations of observed users, information on the computing devices used by the observed users, and other non-ordered data. In addition, the marketing entity collects large amounts of electronic numeric data from the observed users. Numeric data includes ordered data such as ages of observed users, amount of time spent on an online service by the observed users, amount of revenue generated or amount of orders placed by observed users using an online service, and other ordered data.

To be able to compare and associate the collected categorical and numeric data, the marketing entity converts the numeric data to categorical data by the use of a binning algorithm. The binning algorithm determines an appropriate number of categories that a numeric data set will be divided into and numeric data is categorized into the respective bins. By converting the numeric data points to categorical data, the marketing entity effectively reduces a large set of individual data points in a continuous data range to a manageable data set that can be compared with other categorical data.

The marketing entity computes pairwise relationships between the data sets for the categorical data and numeric data (which has been converted to categorical data). The pairwise relationships depict the strength of the correlations/associations between two sets of data variables. For example, a high pairwise relationship between data variables for the geographic location of a observed user and the amount of revenue generated per observed user indicates a strong correlation between the amount of revenue generated and the geographic location. Thus, a high correlation indicates that observed users in certain geographic locations generate more revenue as compared to observed users in other geographic locations. In some embodiments, the marketing entity further groups strongly correlated data variables in hierarchical clusters. The calculated pairwise relationships and hierarchical clusters are displayed via a user interface.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE FIGURES

These and other features, embodiments, and advantages of the present disclosure are better understood when the following Detailed Description is read with reference to the accompanying drawings.

DETAILED DESCRIPTION

Figure 1:
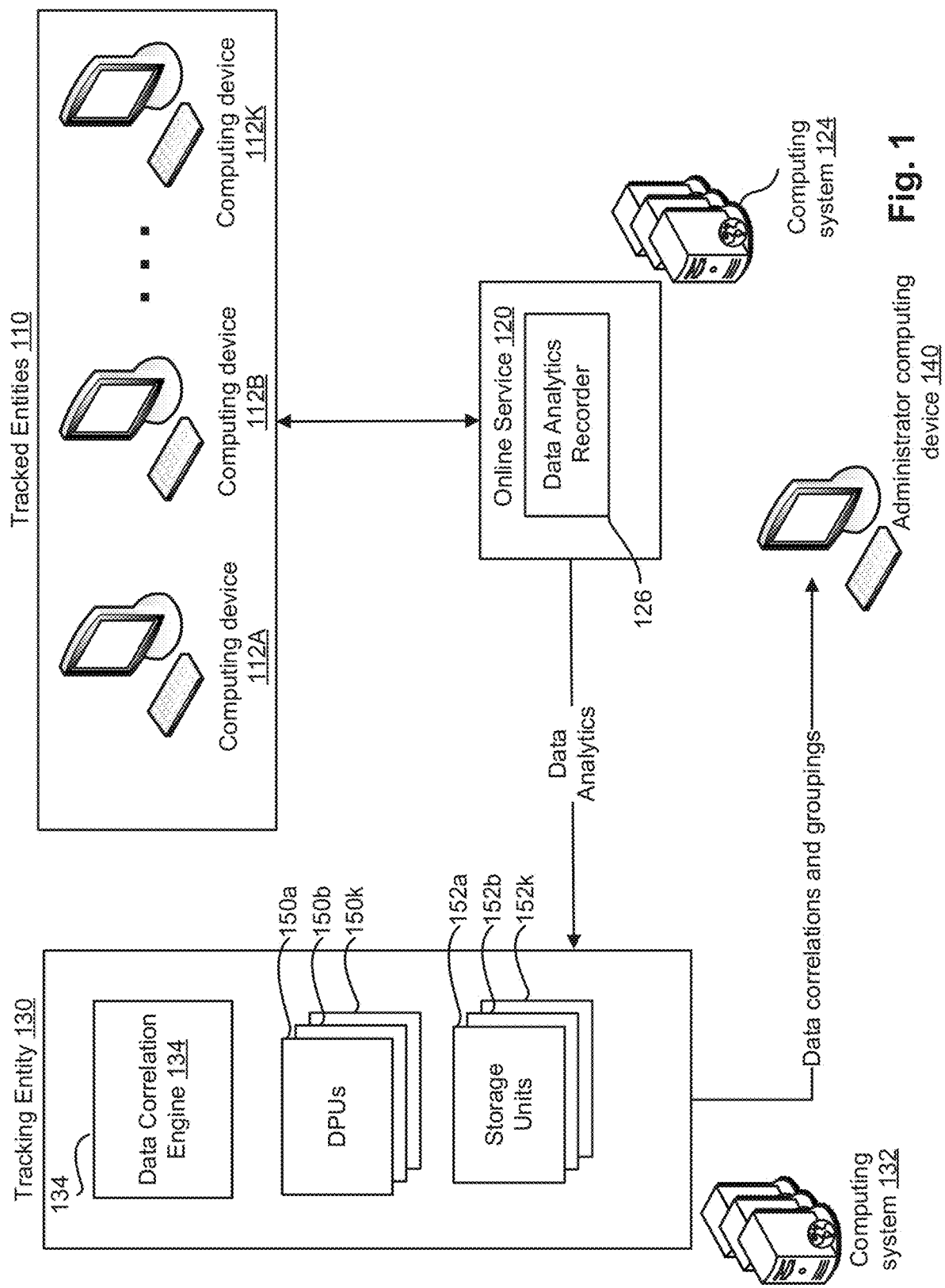
FIG. 1 is a block diagram depicting an example of a system for determining the multivariate relationships of tracked data variables collected from computing devices used by multiple observed users.

Computer-implemented systems and methods are disclosed for identifying the multivariate relationships that exist across categorical and non-categorical/numeric electronic data and visualizing data sets that exhibit strong associations. For example, a marketing entity (e.g., marketer or advertiser or other organization) receives analytics data including the average advertisement revenue generated per observed user and the web browsers used by the observed users. The data on the observed users is being stored across a distributed computing environment, where each observed user's data is stored on a separate machine. Prior techniques used to identify associations in analytics data have generally been limited to identifying correlations in similar types of data. For example, numeric data types, such as revenue generated per observed user, duration of time spent on a tracked website, etc. could only be compared with other numeric data types. Prior techniques did not provide for comparing numeric data types with categorical and other non-numeric data types, such as geographic locations of observed users, web browsers used by observed users, and other non-numeric information. Prior techniques also did not provide for identifying associations in data stored across a distributed computing environment. Marketing entities need to determine associations between both numeric and categorical collected data, where the data for different observed users is spread out across multiple storage units. For example, embodiments disclosed herein allow marketing entities to determine associations between the average advertising revenue generated per observed user (a numeric data set) with the web browser used by the observed users (a categorical data set) through a distributed processing approach.

Specifically, the embodiments disclosed herein allow a marketing entity to identify associations in dissimilar data types by grouping numeric and similar data into bins to reduce the number of items to be correlated into a manageable and meaningful number that are then correlated with categorical data types that have a limited number of discrete values. In this way, for example, a numeric data range from 0-$10 (e.g., data on collected advertising revenue per observed user) is split into 10 bins (e.g., 0-1, 1-2, ..., 9-10) and associations between each bin and categories (e.g., web browser type of observed users) in another data set identified. In this example, purchases in the $0-1 bin are correlated with Web Browser X while purchases in the $9-10 bin are correlated with Web Browser Y, and so on.

As another example, a marketer collects data on a "revenue generated" variable for millions of observed users. This numeric data set contains numerous values in the range 0-$10,000.00 that are mostly unique. The marketer also collects categorical data on the observed users, such as the geographical locations of the users. The categorical data is grouped into distinct categories (e.g., Asia, Europe, North America, etc.). If the marketer needs to determine if there is any correlation between the "revenue generated" variable and the "geographic location" variable, the marketer needs to manage and organize all of the collects data points (potentially 1,000,000 different data points) for revenue. The invention allows the marketer to reduce and organize the collected numeric data to a discrete set of categories. For example, the numeric data is divided into bins of categories 0-100, 101-200, etc. In this example, the data collected on revenue generated is reduced from a spread of 1,000,000 potential data points to a set of 100 categories. The marketer then determines if there is any correlation between revenue generated and geographic location by comparing the category of 0-$100 to the geographic locations, $101-$200 to the geographic locations, etc.

Identifying associations in dissimilar types of data as presented herein allows a marketing entity to improve the design of the web site by ascertaining, for example, which web pages are most relevant to users, which web pages are visited together, which web pages are most frequented, or other traffic pattern information. For example, a web administrator sometimes needs to determine which web sites are most relevant to users located in particular geographic locations. Based on this information, the administrator customizes the design of the website for specific geographic locations.

As used herein, the term "marketing entity" is used to refer to an organization or individual that tracks and collects data pertaining to characteristics and interactions of observed users. Examples of marketing entities include advertisers, retailers, web marketers, financial institutions, and other entities interested in collecting information on end user behavior.

As used herein, the term "observed user" is used to refer to organizations, individuals, and devices that perform activities that are tracked by marketing entities.

As used herein, the term "numeric data" is used to refer to numeric data collected from observed users that is in a continuous, numerically-ordered number range. Non-limiting examples of numeric data includes the age, income of a observed user, duration of time a observed user spends on a website, the number of units of a product that is purchased by observed users over a period of time, the revenue of a product purchase or revenue generated from targeted advertisements, the duration of time since the observed user last purchased a product off of the web page, the duration of time since the observed user first purchased a product off of the web page, and the number of past purchases a observed user made on a website. Numeric data includes continuous data and non-categorical data.

As used herein, the term "categorical data" is used to refer to data collected from observed users where the potential values of the data is not a continuous, numerically-ordered number range. Non-limiting examples of categorical data include the geographic location of at observed user (e.g., the country from which observed user accesses a service associated with the marketing entity), the referring URL that directed the observed user to the online service associated with the marketing entity, operating system or web browser of the computing device used to access the online service associated by the marketing entity.

As used herein, the term "variable" refers to a particular kind of data collected by the marketing entity. Variables include categorical data variables and numeric data variables. For example, data indicating the geographic location of observed users is referred to as the geographic location data variable, a categorical data variable. Data indicating the revenue generated per observed user is referred to as the revenue generated data variable, a numeric data variable.

In embodiments disclosed herein, a marketing entity determines the relationships between disparate data sources aggregated at a specific granularity. For example, a marketing entity aggregates electronic data collected at a session level and at an individual level. Session level data includes a group of interactions from a user (i.e. a observed user) with a tracked feature during a single session (e.g., collecting data on web activity from user interactions during a single web session). Individual level data includes a group of interactions from a user over multiple sessions (e.g., collecting data on web activity from user interactions during multiple sessions over a larger period of time). The aggregated data contains both numeric data (e.g., number of users, duration of time spent on a website, revenue generated from interacting with an advertisement, etc.) and non-numeric/categorical data (e.g., demographic information of the observed users, information on the devices transmitting the data, etc.).

To compare and analyze collected data to determine which tracked features exhibit strong associations, the marketing entity converts the continuous data variables into categorical data variables through the use of a binning algorithm. As used herein, the term "binning algorithm" refers to a computer-implemented process that determines an appropriate number of categories that a numeric data set will be divided into. The binning algorithm reduces each set of collected continuous data to two or more discrete categories. For example, a set of continuous collected data variables includes the age of each user that accessed a marketing entity website. Thousands or even millions of users could be tracked, providing the marketing entity with a continuous set of data points for an "age" variable that ranges, for example, from 0-100. Applying a binning algorithm allows the marketing entity to determine the number of categories that the collected data points can be divided into. For example, the collected age data points are divided into categories of "0-10", "11-20", "21-30", "31-40", etc. The marketing entity groups the continuous data points into the categories determined by the binning algorithm.

The marketing entity further reduces the cardinality of the categorical variables. By reducing the cardinality of categorical variables, the marketing entity reduces (e.g., combines) or eliminates the numerous outliers that is present in the statistical distribution of data points for a variable. For example, a marketing entity captures, in a data set, the web browsers of each user that connects to a marketing entity website. The collected data indicates that there are web browsers that very few users use. The marketing entity reduces (e.g., combines) or eliminates these low frequency data points.

The marketing entity then analyzes the data variables to compute pairwise associations on the collected categorical data and continuous data (which has been converted to categorical data through the process described above). Pairwise associations can be determined by applying a formula that outputs the association measures between any two data variables. The association measure output indicates the strength of the correlation between any two data variables as a measure between 0-1. An association measure closer to 1 indicates a stronger correlation compared to an association measure closer to 0. The marketing entity computes pairwise associations for all data variables against every other data variable in the aggregated collection of data.

For example, the observed user sometimes collects various data variables on users that visited a observed user from different geographic locations using different mobile or desktop browsers. By determining the pairwise associations, the marketing entity determines the correlation between the geographic location of the user and the web browser used by the user. For example, a majority of users located in the United States use a first browser, but a majority of users located in China utilize a second browser. The determined pairwise association between geographic location and web browser in this scenario is closer to 1. In another example, there is sometimes no relationship between the geographic location of the user and the web browser of the user. In this situation, the pairwise association will show a value closer to 0. In a distributed computing environment where the various data variables are stored across multiple storage units, the pairwise association between data variables is calculated via multiple passes over the data.

Once the pairwise associations are computed, the marketing entity determines hierarchical clusters to group the pairwise associations of data variables in coherent groups organized by the strength of the associations. As used herein, the term "hierarchical clusters" refers to groupings of data variables based on strength of correlations between the data variables, the groupings determined by progressively grouping variables showing strong correlation into clusters. An example method to determine hierarchical clusters is the Ward method of clustering. A cluster identifies the data variables that occur together and have strong associations. For example, a cluster indicates sections of a web-site that are frequently visited together. As another example, a cluster indicates that the data variables for the type of operating system, the web browser, and the desktop resolution are highly correlated.

To visualize the identified relationships and groupings of correlated data variables, the marketing entity displays the pairwise associations and/or groups of data variables on a user interface. For example, the hierarchical clusters are displayed on a heatmap matrix organized by the strength of the data associations. Each row and column of the matrix represents a parameter (data variable) of interest. Clusters in the center of the heatmap indicate data variables that have the strongest correlation, and other groups of clusters are depicted by groupings of darker shades to indicate strong associations. As another example, the pairwise associations are displayed on a Chord diagram or a Circos diagram visualization, described further below.

Referring now to the drawings, FIG. 1 is a block diagram depicting a distributed computing environment in which a marketing entity 130 determines the multivariate relationships between various types of data collected from multiple marketing entities 110. Multivariate relationships refer to the associations and groupings between the different data variables collected by marketing entities. The observed users 110 include individuals, organizations, or other entities that operate computing devices 112A-112K to connect to and access an online service 120. The observed users 110 are associated with one or more of the computing devices 112A-112K. As explained above, the electronic nature of large scale data collection allows a large number of observed users 110 from various geographic locations around the world to connect to and access the online service 120.

Because of the large number of the observed users 110, there may also may be a large number of the computing devices 112A-112K. In an example, the computing devices 112A-112K include any type of computing device configured to access the online service 120 over a number of networks (e.g., the Internet), including portable computing devices (e.g., mobile phones, tablet computers, etc.) and conventional computing devices (e.g., desktop computers, laptop computers, server systems, etc.).

As observed users 110 access the online service 120, the observed users 110 generate network traffic to, through, and out of services provided by the online service 120. Online service 120 includes any entity that provides, publishes, or otherwise makes available content on the Internet. For example, in one embodiment, online service 120 includes web site providers and operators. The online service 120 is, in some aspects, hosted on a computing system 124. The computing system 124 includes a server, a portable computing device, a conventional computing device, virtual computing devices, or other computing devices or cluster of computing devices. A content data network, a datacenter, and a network-based server farm are examples of such a computing system 124.

By visiting a website or any other data source provided by online service 120, observed users 110 generate network traffic from which various sets of categorical and numeric data is collected. For example, numeric data such as ages and income levels of the observed users 110 and duration of time the observed users 110 spend on one or more websites published by online service 120 is collected. Data on ages and income levels of observed users and duration of time on websites is typically available in Customer Relationship Management (CRM) data accessible to the computer system 124. In some aspects, online service 120 provides one or more products for purchase or presents various electronic advertisements to observed users 110. Numeric data including the number of units of a product that is purchased, revenue generated for online orders, duration of time since the first purchase from a observed user 110, the number of previous purchases is also collected. Further, categorical data such as the type of computing operating system used to access the online service 120, the geographic locations of the observed users 110, the web browser used to access online service 120, and other categorical data is collected.

To collect the numeric and categorical data from online interactions of observed users 110, the online service 120 in some aspects includes a data analytics recorder 126 configured to record the categorical and numeric data. The data analytics recorder 126 includes any form of data analytics tracking, such as program code modules that execute scripts (e.g., Javascripts), tracking cookies, embedded code, or other software for tracking and recording data representative of the categorical and numeric data. In an example, the scripts, tracking cookies, or other embedded code for tracking is provided by the online service 120 along with any content (e.g. web pages) transmitted to observed users 110. The scripts, tracking cookies, or other embedded code capture relevant categorical and numeric data from observed users 110 and return the tracked data back to online service 120. The traffic recorder 126 in some aspects is also configured to automatically, periodically, or at time intervals cause the computing system 124 hosting the online service 120 to send the tracked categorical and numeric data to a computing system 132 of the marketing entity 130.

The tracked categorical and numeric data includes data from multiple sources, such as web analytics data, customer attribute data, advertisement server data, affiliate data, and email data. As the volume of the collected data increases in size (e.g., in digital marketing) the data is often too large for a single computing device. In the embodiments herein, the computing system 132 is a distributed computing system that includes multiple storage units 152a-k for storing the data and multiple distributed processing units (DPUs) for analyzing the data into correlations and groupings. In some embodiments, the storage units 152a-k and the DPUs 150a-k reside in multiple computing systems (e.g., computing system 132 includes multiple computing systems such as multiple server devices and each DPU 150a-k corresponds to a separate server device). In other embodiments, the storage units 152a-k and the DPUs 150a-k reside in a single computing system and each DPU 150a-k corresponds to a different processing device.

Collected numeric and categorical data on different customers is stored on respectively different storage units 152a-k. For example, data collected from computing device 112a is stored in storage unit 152a and data collected from computing device 112b is stored in storage unit 152b. Further, data in each storage unit 152 is analyzed by multiple DPUs 150a-k. For example, data stored in storage unit 152a is analyzed by multiple DPUs (e.g., DPUs 150a-c) and data stored in storage unit 152b is analyzed by multiple DPUs (e.g., DPUs 150d-f).

The marketing entity 130 implements a data correlation engine 134 to perform the operations described herein. The data correlation engine 134 includes code modules executable by one of the DPUs 150a-k. The DPU 150 executing the data correlation engine is sometimes referred to as a querying server or a master node. The data correlation engine 134 transforms data received from computing system 124 to a proper format for analysis via an extract, transform, and load (ETL) process. The data correlation engine 134 also analyzes the received data sets (as transformed via the ETL process) and determine the relationships and associations between sets of collected data. When executed, the code modules for the data correlation engine 134 configure the computing system 132 to perform various operations related to collecting numeric and categorical variables, determining pairwise relationships between the variables, and generating a visualization of correlated data groupings. As used herein, the term "pairwise relationships" refers to the correlations/associations among the collected data (including the categorical and numeric data (which, as disclosed herein, are converted to categorical data)). Correlations and associations are used herein interchangeably. A strong pairwise relationship between two data variables indicates a high correlation between the two variables. A weak pairwise relationship between two data variables indicates a low correlation between the two variables.

Examples of the generated visualizations of correlated data groupings is depicted and further descripted in FIGS. 3-6. In some aspects, the generated visualizations of the correlated data groupings are presented at different levels of granularity.

The data correlation engine 134, in some aspects, causes the computing system 132 to host a user interface such that an administrator of the marketing entity 130 (e.g., marketing or advertising administrator, web site administrator, etc.) operates a computing device 140 to access the analysis and visualizations of correlated data groupings. In another example, the data correlation engine 134 causes the computing system 132 to send the data analytics, pairwise associations between data variables, and visualizations to the computing device 140 for display to the web site administrator without further interaction with the computing system 132.

The networks in which observed users 110 access online service 120 and in which tracking computing system 130 receives the tracked analytics data include communication networks configured to connect the computing devices 112A-112K and the computing system 124 hosting the online service 120. In an example, the networks include any one or a combination of many different types of networks, such as cable networks, the Internet, wireless networks, cellular networks, and other private and/or public networks.

Figure 2:
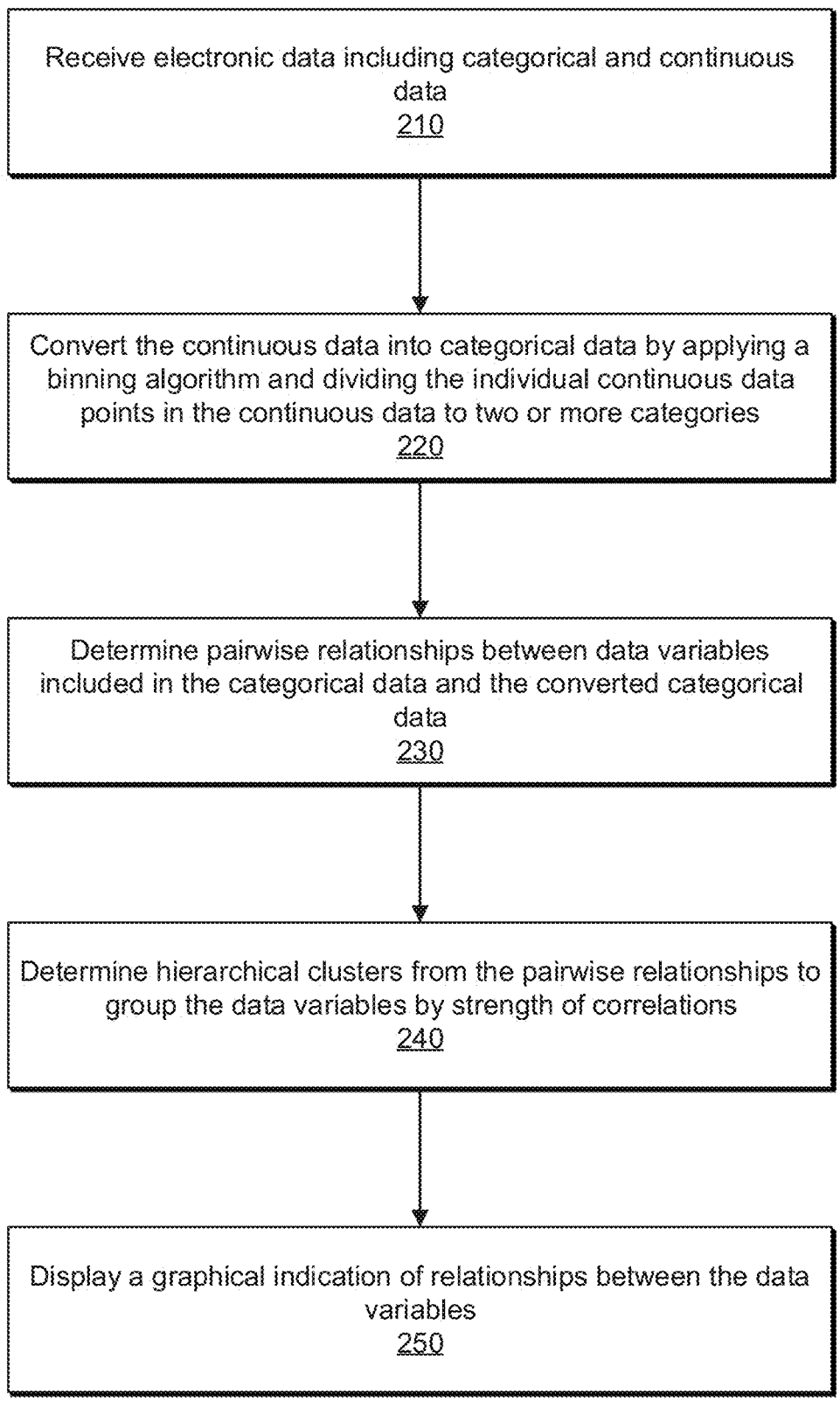
FIG. 2 is a flowchart illustrating an exemplary method for determining multivariate relationships of tracked data variables collected from multiple observed users.

As mentioned above, the data correlation engine 134 includes code modules executable by the computing system 132 (via one of the DPUs 150a-k) to perform operations for determining the multivariate relationships between disparate types of collected data. FIG. 2 is a flowchart depicting an example process 200 for performing said operations. The process 200 is performed by the data correlation engine 134 depicted in FIG. 1 or by any other suitable component or in any suitable computing and/or communication environment.

The process 200 involves receiving electronic data including categorical and continuous data, as shown in block 210. For example, computing system 124, via data analytics recorder 126, collects a multitude of categorical and numeric data from plurality of observed users 110. In some embodiments, computing system 124 is a network-based server and transmits the collected data to computing system 132. The collected categorical and numeric data is provided to data correlation engine 134 executing in computing system 132 for further processing.

In some embodiments, the electronic data collected from the plurality of observed users 110 includes aggregated session-level data and individual-level data. Session-level data includes numeric and categorical data collected during single online session. Individual-level data includes numeric and categorical data collected during multiple online sessions for a particular observed user 110. For example, if a observed user 110 visits a website of online service 120 fifty times during a one-month time period, session-level data includes numeric and categorical data collected on the observed user 110 during one of the visits of the website (i.e. the particular web-session in which the observed user 110 interacted with the online service 120). The individual-level data includes data collected and aggregated across all fifty visits with the online service 120.

In some embodiments, the data correlation engine 134 receives inputs from an administrator (e.g., via administrator computing device 140) specifying the level of granularity in which to analyze the collected categorical and numeric data. For example, the received inputs indicate whether to filter the collected and received numeric and categorical data by a certain session-level identifier (e.g., by identifying a particular log on session by specifying the time of day or other identifier to specify the particular session). The received inputs further indicate whether to aggregate session-level data and individual-level data. Additionally, the collected data frequently occurs in different hierarchies. For example, consider one visitor of a website for a observed user, and the visitor visits the website multiple times (multiple web sessions). During each visit, the visitor accesses multiple web pages that are viewed during that web session. During each web session, the data that is collected exists at different hierarchies and is selectable by specifying a particular granularity. Data exists at different hierarchies. For example, one level of the hierarchy includes data collected at the visitor level, another level of the hierarchy includes data collected at a page visit level, and a third level of the hierarchy includes data collected at a page view level. For example, data collected at the visitor hierarchy indicates numeric data such as the observed user's age, income, loyalty level (e.g., if the observed user is tracking loyalty points such as frequent flyer miles, hotel points, etc.), and the categorical data such as the visitor's address. Data collected at a "visit" hierarchy includes the numeric data such as visit's start time (i.e. the start time during access of the web site), duration of the visit, information on any orders that were placed during the visit, revenue generated, including advertising revenue, during the visit, and categorical data such as the visitor's geographic location. Data collected at a "page view" hierarchy includes numeric data such as the start time of the page view, the end time of the page view (e.g., when the user exits the web page), and categorical data such as the name of the web page visited and the actions taken during that web page visit. Via a user interface presented at administrator computing device 140, an administrator selects the level of granularity at which associations are to be computed by the data correlation engine 134.

The process 200 further involves converting the continuous data into converted categorical data by applying a binning algorithm and dividing the individual continuous data points in the continuous data into two or more categories, as shown in block 220. Any suitable binning algorithm is used for determining the number of "bins" (i.e. categories) for which to divide the continuous data points into. For example, in one embodiment, a binning algorithm defined by Sturges' formula is used: $k=(\log_2 n+1)$, where k is the number of bins and n is the number of data points in the collected continuous set of data. As an example, the data correlation engine 134 receives numeric data from online service 120 indicating the ages of individual users operating computing devices 112a-k of observed users 110. The collected numeric data on the ages of the users show that there are one-hundred total data points (i.e. ages on one-hundred users/one-hundred observed users 110) and the values of the data points range from 8 years of age to 72 years of age. Applying the Sturges' formula as the binning algorithm, the data correlation engine 134 calculates a k value as $\log_2 100+1=7.64$. The data correlation engine 134 drops the remainder to yield a total of seven bins/categories for which to convert the numeric data into (in other embodiments the data correlation engine 134 rounds the k value to a total of eight bins). The data correlation engine 134 then divides the individual continuous data points (e.g., the collected ages of the users of the observed users 110 ranging from 8-72) into the seven bins. For example, the data correlation engine 134 assigns the data points into the following bins/categories according to the values of the data points:

[8-17), [18-26), [27-35), [36-44), [43-53), [54-62), [63-72]

The above bins indicate to the data correlation engine 134 the number of observed users 110 that have ages ranging from 8-17, the number of observed users 110 that have ages ranges from 18-26, and so forth. While an even distribution of continuous data points into bins is shown above for illustrative purposes, present embodiments include any manner of distribution for deriving a histogram of the collected continuous data points.

For example, in another example embodiment, the binning algorithm assigns data points into the following five bins/categories:

[0, 1), [1, 2), [2, 3), . . . [9, 10), [10, infinity].

In this example, all data points that fall within the value of 0 and 1 fall in the first bin, between 1 and 2 into the second bin, etc. until the fifth bin. All data points that are greater than 10 fall into the fifth bin. This binning algorithm is useful in analyzing numeric data that inherently contains a majority of values less than 10. In one example illustrating this point, the data correlation engine 134 receives numeric data indicating the time observed users 110 spend interacting with online service 120 in values measured in hours. The binning algorithm described above (with a fifth bin categorizing all data points with a value greater than ten) allows an administrator to categorize numeric data on the time multiple observed users 110 spend interacting with online service 120.

In another example, the binning algorithm includes assigning data points as percentiles. With this approach, $p_x$ denotes the value for which x % of the data points lie below. If the administrator configures the data correlation engine 134 to divide continuous data variables into percentiles at 10% ranges, the bins include:

[0, $p_{10}$), [$p_{10}$, $p_{20}$), [$p_{20}$, $p_{30}$), [$p_{30}$, $p_{40}$), . . . [$p_{90}$, infinity].

The binning algorithm and the specific algorithm for distributing the data points into the identified number of bins are configurable elements of the data correlation engine 134. For example, an administrator provides inputs to computing system 132 or at administrator computing device 140 that configure the data correlation engine 134 with the indicated binning algorithm and algorithm for distributing data points. In other embodiments, the binning algorithm and algorithm for distributing data points into the identified bins are pre-determined and configured in the program code of the data correlation engine 134. Applying a binning algorithm to convert the continuous data into converted categorical data allows the data correlation engine 134 to reduce a large number of data points to a manageable set for further analysis and comparison against categorical/non-numeric data.

In the following example embodiment, the data correlation engine 134 executing in one of the DPUs 150a-k converts the continuous data into converted categorical data by implementing two passes over the data scattered across the storage units 150a-k. In the first pass, the data correlation engine 134 determines multiple maximum and minimum values of the different data sets processed by each DPU 150a-k. Via this process, the data correlation engine 134 determines the minimum and maximum numeric data values for the individual DPUs 150a-k. For example, consider DPU 150a configured to analyze data $x_{1,1}, \ldots, x_{1,l_1}$ (e.g., data stored in storage unit 152a), DPU 150b configured to analyze data $x_{2,1}, \ldots, x_{2,l_2}$ (e.g., data stored in storage unit 152b), etc. During the first pass, the $i^{th}$ DPU computes the minimum and the maximum of the data that resides on $i^{th}$ DPU (or the data that resides on the storage unit 152 corresponding to the $i^{th}$ DPU. The minimum numeric data value for the $i^{th}$ DPU is referred to as $L_i$ and maximum numeric data value for the $i^{th}$ DPU is referred to as $H_i$. From the maximum and minimum numeric data points across all DPUs 150a-k, data correlation engine 134 determines the overall maximum and overall minimum across the entire data set, defined as L=min $L_i$ and H=max $H_i$. Data correlation engine 134 then determines the bins by applying the following formula:

$$\left[L, L+(H-L)\times\frac{1}{N}\right), \left[L+(H-L)\times\frac{1}{N}, L+(H-L)\times\frac{2}{N}\right), \ldots,$$

$$\left[L+(H-L)\times\frac{9}{N}, H\right].$$

In the formula above, 'N' corresponds to the number of bins. During the second pass, the data correlation engine 134 queries each DPU 150a-k to determine the number of data points in the respective data set for each DPU 150a-k that fall within the defined bins. To determine the number of data points in the bins, the data correlation engine 134, via the querying server or master node (i.e. the one DPU 150 that is executing the data correlation engine 134), provides the information defining the bins ($B_1, \ldots, B_N$) to the individual DPUs 150a-k. Each DPU 150a-k reports back to the querying server the counts of data points that are within each bin. For example, DPU 150a reports a vector ($c_{1,1}, c_{1,N}$) that indicates the number of data points processed by DPU 150a that fall within each bin (assuming in this example N different bins). Specifically, element $c_{1,1}$ of the reported vector corresponds to the number of data points for DPU 150a that fall within bin $B_1$. Element $c_{1,2}$ of the reported vector corresponds to the number of data points for DPU 150a that fall within bin $B_2$, and so on. Similarly, DPU 150b reports a vector that indicates the number of data points processed by DPU 150b that fall within each bin. The querying server then aggregates the reported vectors from the different DPUs 150a-k to determine the distribution of the categorical version of numeric variables across all of the DPUs 150a-k by applying the following summation: ($c_j=\Sigma_{i=1}^{D}c_{j,i}$), assuming there are D DPUs.

In some embodiments, the data correlation engine 134 reduces the cardinality in the categorical variables (e.g., variables such as geographic location of a observed user 110, non-numeric demographic information on the observed user 110, etc.) and converted categorical variables (e.g., revenue generated per observed user 110, duration of the visit of a website, and other numeric variables organized in bins/categories per the binning process described above). For example, categorical variables sometimes include numerous possible values and distribution of these values are sometimes highly skewed. This is because certain data variables include potentially hundreds of different values. Examples include geographic location of a observed user 110 or the referrer URL (i.e. the URL of the website that directed observed user 110 to online service 120), which include hundreds or more of possible values. In an example, the categorical variable indicating the geographic location of observed users 110 indicates that 99% of observed users 110 are accessing online service 120 from one of five countries. The remaining 1% of observed users 110 are accessing online service 120 from dozens of other countries. Given the large number of possible values in the categorical information, the data correlation engine 134 reduces the cardinality of the categorical variables by grouping the infrequently occurring or rare values to an "other" category.

Various methods for reducing the cardinality of categorical variables are considered. For example, in one embodiment, the data correlation engine 134 collects infrequently occurring values such that the resulting total number of possible values for the categorical variable is X, wherein X is a configurable number. Taking the example above (considering the categorical variable indicating the geographic locations of observed users 110), 99% of observed users 110 access online service from one of five countries and 1% of observed users 110 access online service 120 from one of dozens of other countries. In this example, the data correlation engine 134 collects the infrequently occurring values such that the total number of possible values is six. Thus, the resulting histogram after reducing the cardinality of the geographic location variable depicts a distribution of observed users 110 in five countries and in a sixth category for "other" countries.

In a distributed computing environment, since the data resides in a distributed fashion across storage units 152a-k and processed via different DPUs 150a-k, the data correlation engine 134 reduces the cardinality of the categorical variables with a two-stage approach. In the following embodiment, there is a total of K unique values of a categorical value. The $i^{th}$ DPU returns a vector of the form $(c_{i,1}, c_{i,2}, \ldots, c_{i,K})$, each element in the vector corresponding to the number of each of the K values. In the first pass, each DPU 150a-k returns the vector as shown above. Once the data correlation engine 134 receives vectors from each DPU 150a-k indicating the total number of unique values for the categorical variable, the data correlation engine 134 determines a single vector of size K by aggregating the information from all DPUs 150a-k $(c_1, c_2, \ldots, c_K)$ where $c_j = \sum_{i=1}^{D} c_{i,j}$, where D is the number of DPUs. The data correlation engine 134 then collects the rare classes of categorical variable into a group labeled "Other" such that the resulting total number of possible values for the categorical variable is X, X being a configurable number.

The process 200 further involves determining pairwise relationships between data variables included in the categorical data and the converted categorical data, as shown in block 230. Pairwise relationships/associations between categorical data variables indicate the strength of associations between the data variables. For example, one categorical data variable, X, tracks the web browser application used by observed users 110 for accessing online service 120. A second categorical variable, Y, tracks the geographic locations of the observed users 110. By determining the pairwise relationships/associations between categorical data variables X and Y, the data correlation engine 134 determines the strength of the correlation, if any, between the geographic location of the observed users 110 and the web browser used to access online service 120, as described further below. A high correlation indicates that observed users 110 using a first web browser are typically located at a first geographic location and observed users 110 using a second web browser are typically located at a second geographic location. An administrator or marketing entity 130 configuring online service 120 may use information indicating high correlation of variables X and Y to tailor the online service 120 based on geographic location. For example, the administrator or marketing entity 130 configures online service 120 to display web pages optimized for a first web browser when the marketing entity 110 accessing the online service 120 is from a first geographic location, and further configures online service 120 to display web pages optimized for a second web browser when the marketing entity 110 accessing online service 120 is from a second geographic location.

Different non-limiting formulas are considered herein for computing the pairwise relationships between categorical data variables. For example, in one embodiment, the data correlation engine 134 determines the pairwise relationships between categorical data variables by calculating uncertainty coefficients between the data variables. In the following example, consider the same variables X and Y discussed above (X indicating the web browser application used and Y indicating the geographic locations of observed users 110). Also consider X as having k number of possible values (i.e. k number of web browsers that can be used) and Y as having r number of possible values (i.e. r number of geographic locations that are tracked).

Further, in the following formulas for computing an uncertainty coefficient, let $N_{ij}$ be the number of observations that have the $i^{th}$ value of X and $j^{th}$ value of Y. In other words, $N_{11}$ refers to the total number of occurrences in which observed users 110 use a first browser in a first geographic location, $N_{21}$ refers to the total number of occurrences in which observed users 110 use a second browser in a first geographic location, $N_{12}$ refers to the total number of occurrences in which observed users 110 use a first browser in a second geographic location, and $N_{22}$ refers to the total number of occurrences in which observed users 110 use a second browser in a second geographic location. Similarly, let $N_{i\cdot}$ be the total number of observations having the $i^{th}$ value of X (i.e. the total number of observed users 110 that use the $i^{th}$ web browser), $N_{\cdot j}$ be the total number of observations having $j^{th}$ value of Y, (i.e. the total number of observed users 110 that access online service 120 from the $j^{th}$ geographic location), and let N be the total number of observations (i.e. the total number of observed users 110).

Given the above definitions, the data correlation engine 134 determines the uncertainty coefficient $U(x,y)$ via the following:

$$N_{i\cdot} = \sum_j N_{ij}, \quad N_{\cdot j} = \sum_i N_{ij}, \quad N = \sum_{i,j} N_{ij}$$

$$p_{ij} = \frac{N_{ij}}{N}, \quad p_{i\cdot} = \frac{N_{i\cdot}}{N}, \quad p_{\cdot j} = \frac{N_{\cdot j}}{N}$$

$$H(x, y) = -\sum_{i,j} p_{ij} \ln p_{ij}$$

$$H(x) = -\sum_i p_{ij} \ln p_{i\cdot}$$

$$H(y) = -\sum_j p_{ij} \ln p_{\cdot j}$$

$$U(x, y) = 2\left[\frac{H(x) + H(y) - H(x, y)}{H(x) + H(y)}\right]$$

By applying the above formulas, the data correlation engine 134 determines an uncertainty coefficient $U(x,y)$ that falls between 0 and 1. A value closer to 1 denotes stronger association between variables X and Y (e.g., a stronger correlation between geographic location of a observed user 110 and the web browser used by observed user 110). A value closer to 0 denotes a lesser association between variables X and Y.

In another embodiment, the data correlation engine 134 determines the pairwise relationships between categorical data variables by calculating the association measure for Cramer's V. Utilizing the same formulaic definitions from above:

$$X^2 = \sum_{i,j} \frac{\left(N_{ij} - \frac{N_i N_{\cdot j}}{N}\right)^2}{\frac{N_i N_{\cdot j}}{N}}$$

$$V = \sqrt{\frac{X^2/N}{\min(k-1, r-1)}}$$

In the above formula, V indicates the correlation between two categorical data variables X and Y as a value between 0 and 1. A value closer to 1 denotes stronger association between variables X and Y (e.g., a stronger correlation between geographic location of a observed user 110 and the web browser used by observed user 110). A value closer to 0 denotes a lesser association between variables X and Y.

In a distributed computing environment, the data correlation engine 134 determines the pairwise associations via a two-stage approach. Specifically, the data correlation engine 134 determines $N_{ij}$ as defined above by querying each DPU 150a-k and then aggregating the reported results to determine the total number of observations that have the $i^{th}$ value of X and $j^{th}$ value of Y. For example, consider two variables X and Y (one or both of which are numeric variables converted to categorical variables as described above). Let the bins determined by the data correlation engine (via the process described with reference to block 220) be ($B_{1,1}$, $B_{1,2}, \ldots, B_{1,l_1}$) and ($B_{2,1}, B_{2,2}, \ldots, B_{2,l_2}$). For the two categorical variables X and Y, with $l_1$ and $l_2$ possible values, respectively, $N_{ij}$ is the number of observations over all DPUs 150a-k that have the $i^{th}$ value of X (out of $B_{1,1}, B_{1,2}, \ldots, B_{1,l_1}$) and $j^{th}$ value of Y (out of $B_{2,1}, B_{2,2}, \ldots, B_{2,l_2}$). For each DPU 150a-k, the data correlation engine 134 determines the number of data points that satisfy the condition $X=B_{1,i}$ and $Y=B_{2,j}$. The count on the $k^{th}$ DPU of the number of data points that satisfy the above mentioned condition is defined as $N_{ij,k}$. Next, the data correlation engine 134 determines the required values for $N_{ij}$ via the summation $N_{ij}=\Sigma_{k=1}^{D}N_{ij,k}$. The data correlation engine 134 then determines pairwise relationship between X and Y by determining the uncertainty coefficient or by calculating the association measure for Cramer's V as explained above.

While approaches for determining the strength of the associations between categorical variables is shown above for illustrative purposes, any suitable formula for determining associations is considered herein. Via the process described above, the data correlation engine 134 determines the strength of the associations between all categorical variables and converted categorical variables (i.e. the original numeric variables that were categorized according to the binning algorithm as discussed above).

Figure 3:
FIG. 3 is a diagram depicting an example heatmap visualization on a user interface, the heatmap showing groups of highly correlated associations between collected data variables.

Once all pairwise associations are determined between categorical variables, the data correlation engine 134 determines hierarchical clusters from the pairwise relationships to group the data variables by the strength of the associations, as shown in block 240. Both categorical data variables and converted categorical data variables (i.e. the collected data that was originally numeric in nature and converted via the binning algorithm described above) are considered when determining the hierarchical clusters. The hierarchical clusters of categorical variables indicate groups of categorical data variables that exhibit strong associations. FIG. 3 below is a visual depiction of the output of clustering of categorical data variables.

To determine the hierarchical clusters, the data correlation engine 134 applies a method of clustering, such as the Ward method of clustering, which is an agglomerative clustering mechanism. The Ward method of clustering assumes that all collected data points are individual clusters and determines the associations between data points that are strongest. The strongest associations are grouped as a single cluster. This process is repeated until all groups belong to a single cluster (in some instances, categorical data variables that are not correlated with any other variable form their own individual clusters). The optimal choice for the final number of clusters is configurable.

Alternate approaches for clustering are also considered herein. For example, to determine the clusters of data variables exhibiting strong associations, the data correlation engine 134 applies alternate methods of clustering such as complete linkage clustering, single linkage clustering, or average linkage clustering. These examples are non-limiting and other methods of clustering are possible.

The data correlation engine 134 then displays a graphical indication of relationships between the categorical data variables, as shown in block 250. For example, the data correlation engine 134 outputs, either to a user interface for computing system 132 or to administrator computing device 140, a visualization of the relationships between the categorical and converted categorical data variables. The visualization of the data groupings and the pairwise relationships between variables depicts the multivariate relationships between disparate types of data collected from numerous sources. Example visualization are shown in FIGS. 3-9 below.

The display device of computing system 132 or administrator computing device 140 is configured so that the display device displays the graphical indication of relationships between the data variables. For example, configuration of the display device includes distributing the data variables into identified bins, determining pairwise relationships between the data variables, generating a graphical indication of the relationships as described above with respect to blocks 210-250, and further includes transmitting the graphical indication to the display device of computing system 132 or administrator computing device 140.

FIG. 3 depicts one example of a visualization or graphical indication of the relationships between categorical data variables (including the converted categorical variables). The visualization shown in FIG. 3 is a heatmap of a computational association matrix. The heatmap displays the groupings of categorical variables. The rows and columns of the heatmap depict the various categorical variables, and the individual cells (i.e. the intersection/cross section of each row and column) depicts the strength of the correlation between data variables, the strength shown by the shade of the cell. Stronger associations have darker shades of cells. Clusters/groupings of data variables (calculated via the process described above) are shown as groups occurring together. For example, cluster 310 depicts dark shading of cells occurring together for categorical data variables of operating system used, browser used, and resolution of the operating system. Cluster 310 represents a strong association between the type of operating system, type of browser, and the resolution of the computing system used as observed users 110 access online service 120.

Figure 4:
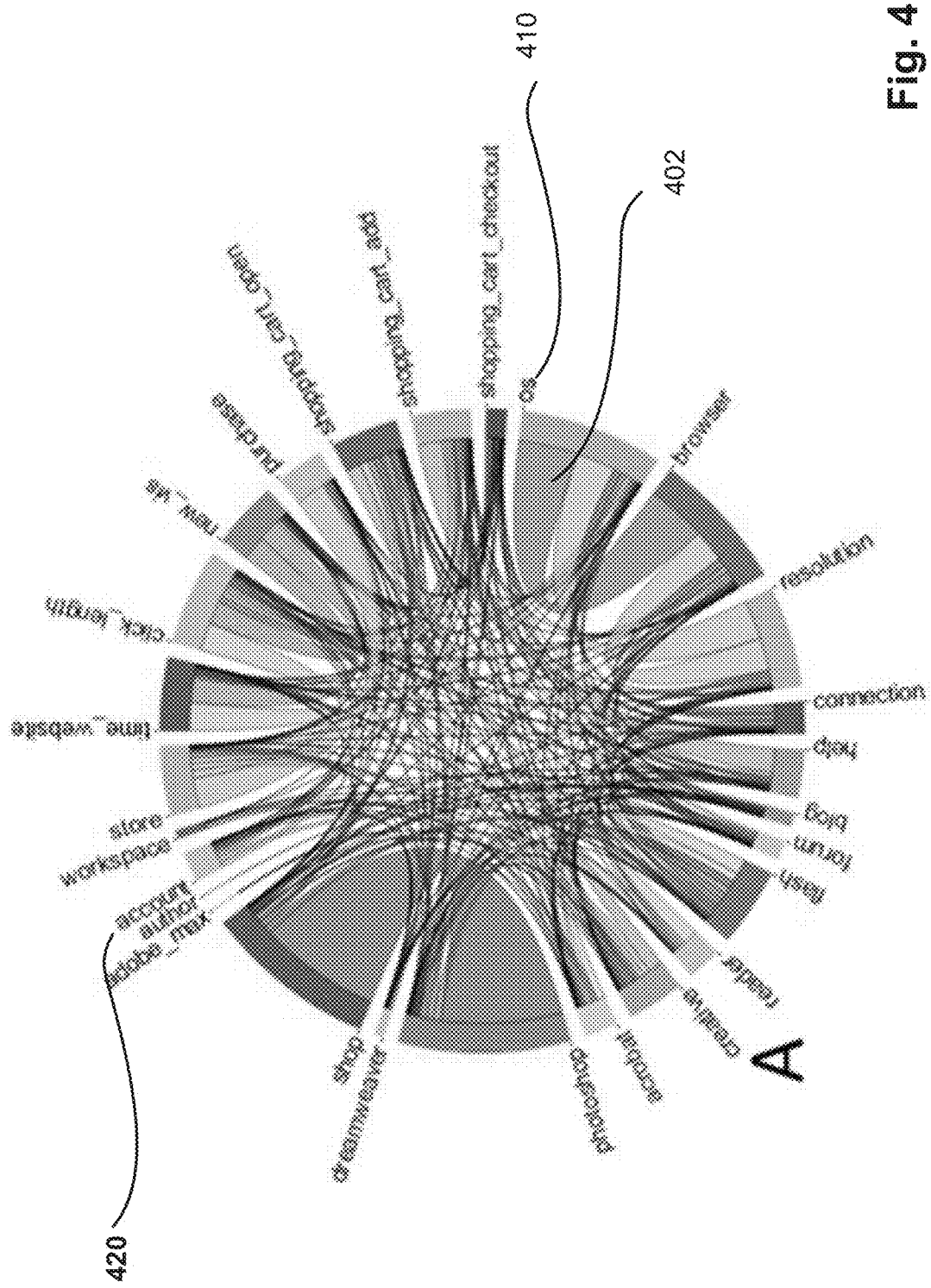
FIG. 4 is a diagram depicting an example chord diagram visualization on a user interface, the chord diagram depicting the pairwise associations between the collected data variables.

FIGS. 4-9 depict additional examples of visualizations or graphical indications of the relationships between categorical data variables (including the converted categorical variables). Specifically, FIGS. 4-9 depict chord diagrams. The edges of the chord diagrams in FIGS. 4-9 show the various categorical data variables that have been analyzed for pairwise relationships via the method described above. Pairwise associations between the categorical data variables are shown as chords connecting the data variables. A thicker chord indicates a stronger correlation between two data variables than a thinner chord. Example chord 402 shows the high correlation between the web browser used and the operating system used by observed users 110. FIG. 4 also illustrates that the arc length (i.e. the percentage of the circle taken by a data variable) provided to each data variable is proportional to the sum of its association values (correlation strengths) with all other data variables. For example, the variable for operating system 410 (i.e. variable tracking the operating system used by observed users 110) has a longer arc than the variable for account 420 (i.e. variable tracking the duration of time when observed users 110 access an account information section of online service 120). The longer arc length of the operating system variable 410 indicates that the operating system used by marketing entities 110 is more associated with other categorical variables, whereas the account variable 420 is not associated/correlated with any other categorical variable.

Figure 5:
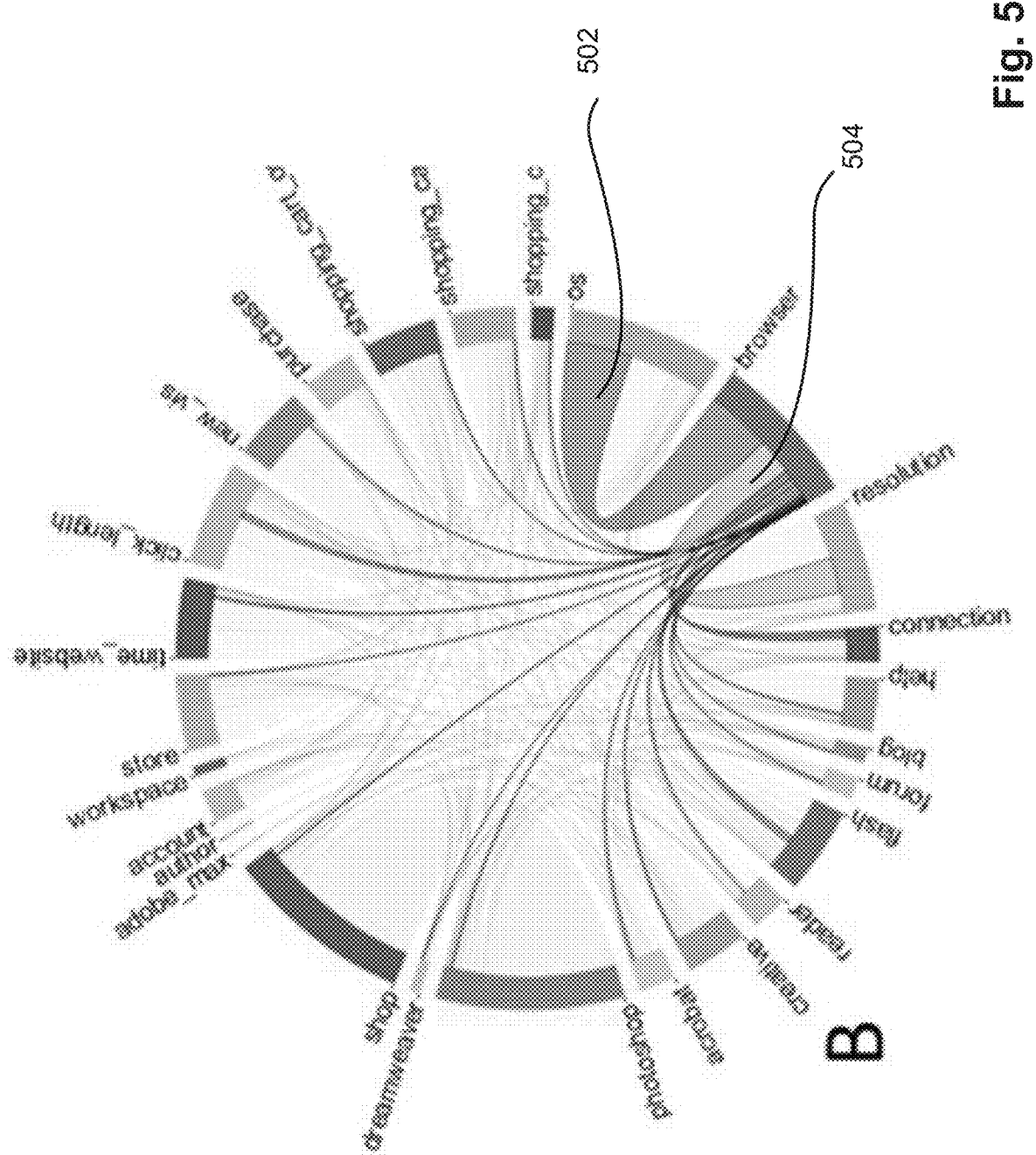
FIG. 5 is a diagram depicting the example chord diagram visualization of FIG. 4, with certain user interface elements highlighted.
Figure 6:
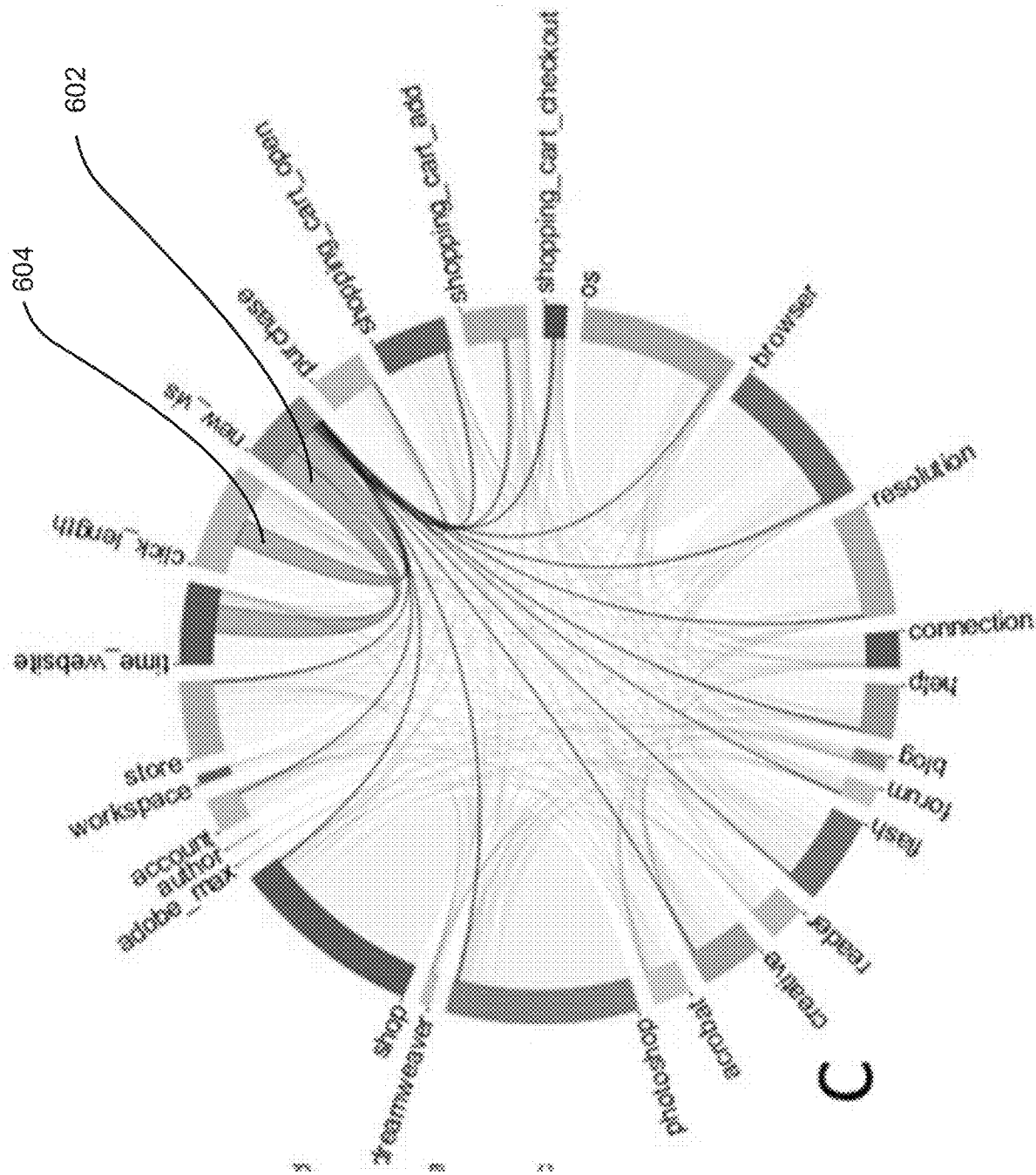
FIG. 6 is a diagram depicting the example chord diagram visualization of FIG. 4, with additional user interface elements highlighted.

In some embodiments, an administrator viewing the visualization shown in FIG. 4 provides inputs on the user interface of administrator computing device 140 or of computing system 132 to select or otherwise focus on one or more categorical data variables in the chord diagram. FIGS. 5 and 6 depict example chord diagrams in which an administrator has focused on certain data variables for clearer visual depiction of the focused data variables. The user input is received via any suitable user interface method (e.g., a touch input selecting one or more chords, a mouse input via hovering or clicking on one or more chords, etc.). In FIG. 5, chords 502 and 504 are highlighted. Chord 502 illustrates a strong correlation between the browser used by observed users 110 and the operating system used by observed users 110. This indicates to an administrator, for example, that there is a correlation between the web browser used to access online service 120 with the operating system utilized by the computing device that is accessing online service 120. Similarly, chord 504 depicts a correlation between the browser used by observed users 110 and the resolution of the display of the computing device used to access online service 120. Taken together, chords 502 and 504 indicate to an administrator that analysis of the multitude of data collected from observed users 110 shows that there is a strong correlation between the browser used by the observed user 110 in accessing online service 120 with the operating system of the computing device and the resolution of the display of the computing device.

Similarly, FIG. 6 depicts selection of chord 602. Chord 602 shows an association between the categorical data variable identifying if a observed user 110 is accessing online service 120 for the first time with the converted categorical data variable tracking the duration of time spent on a website of the online service 120. Further, chord 604 shows an association between the categorical data variable identifying if a observed user 110 is accessing online service 120 for the first time with the converted categorical variable identifying the average click length of the session (e.g., the average number of times a observed user 110 clicked or otherwise selected a user interface element displayed by online service 120).

Figure 7:
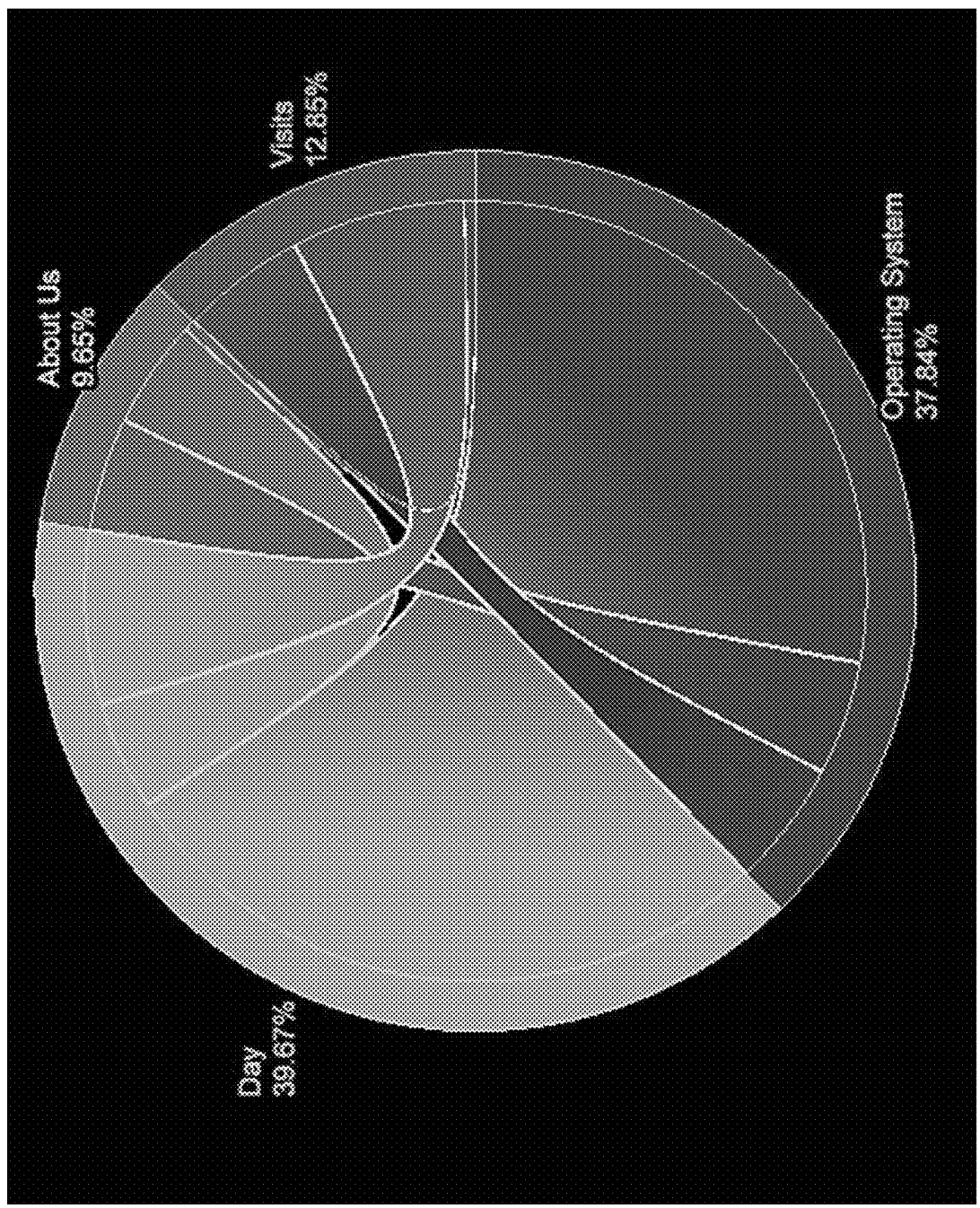
FIG. 7 is a diagram depicting an alternate version of a chord diagram visualization on a user interface, the chord diagram depicting the pairwise associations between the collected data variables.
Figure 8:
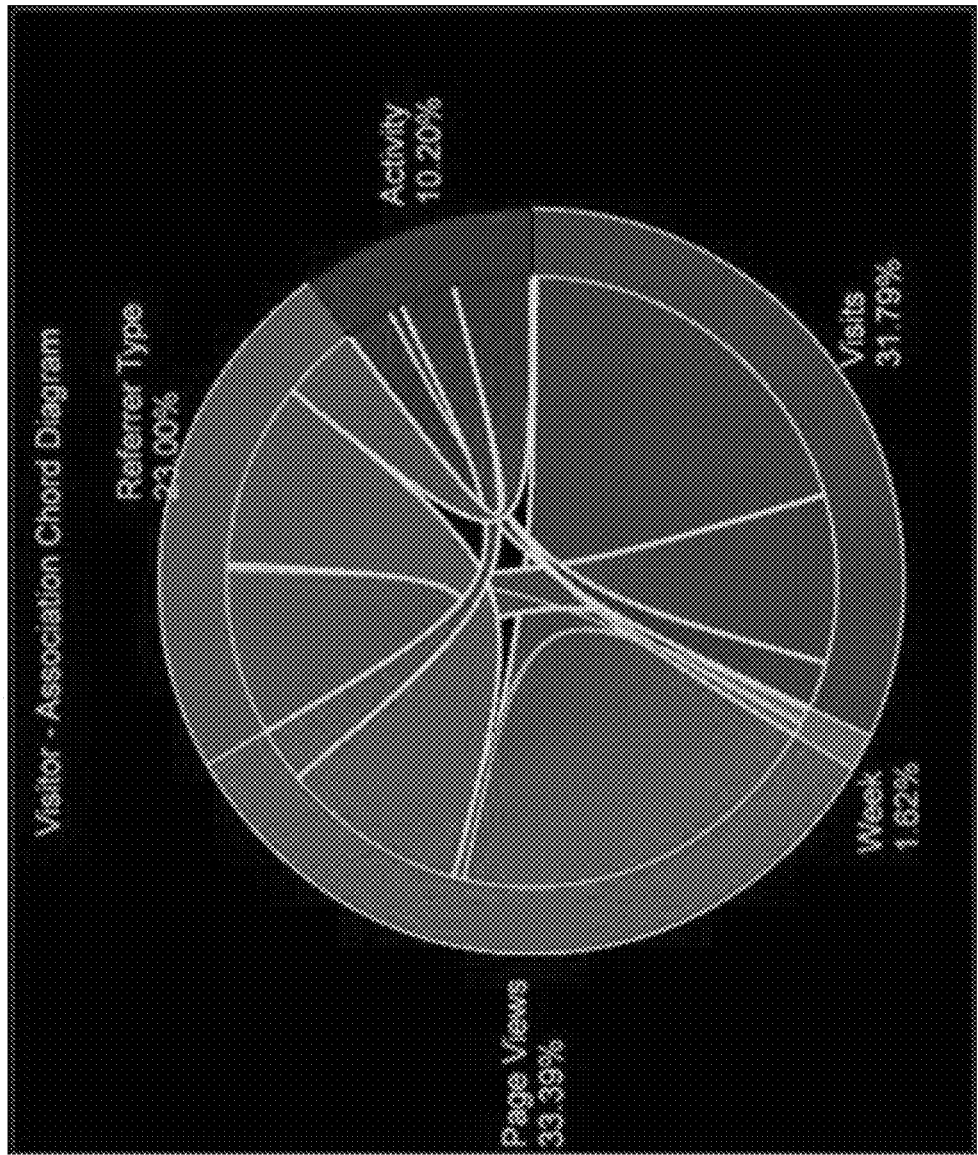
FIG. 8 is a diagram depicting an additional embodiment for a chord diagram visualization on a user interface, the chord diagram depicting the pairwise associations between the collected data variables.
Figure 9:
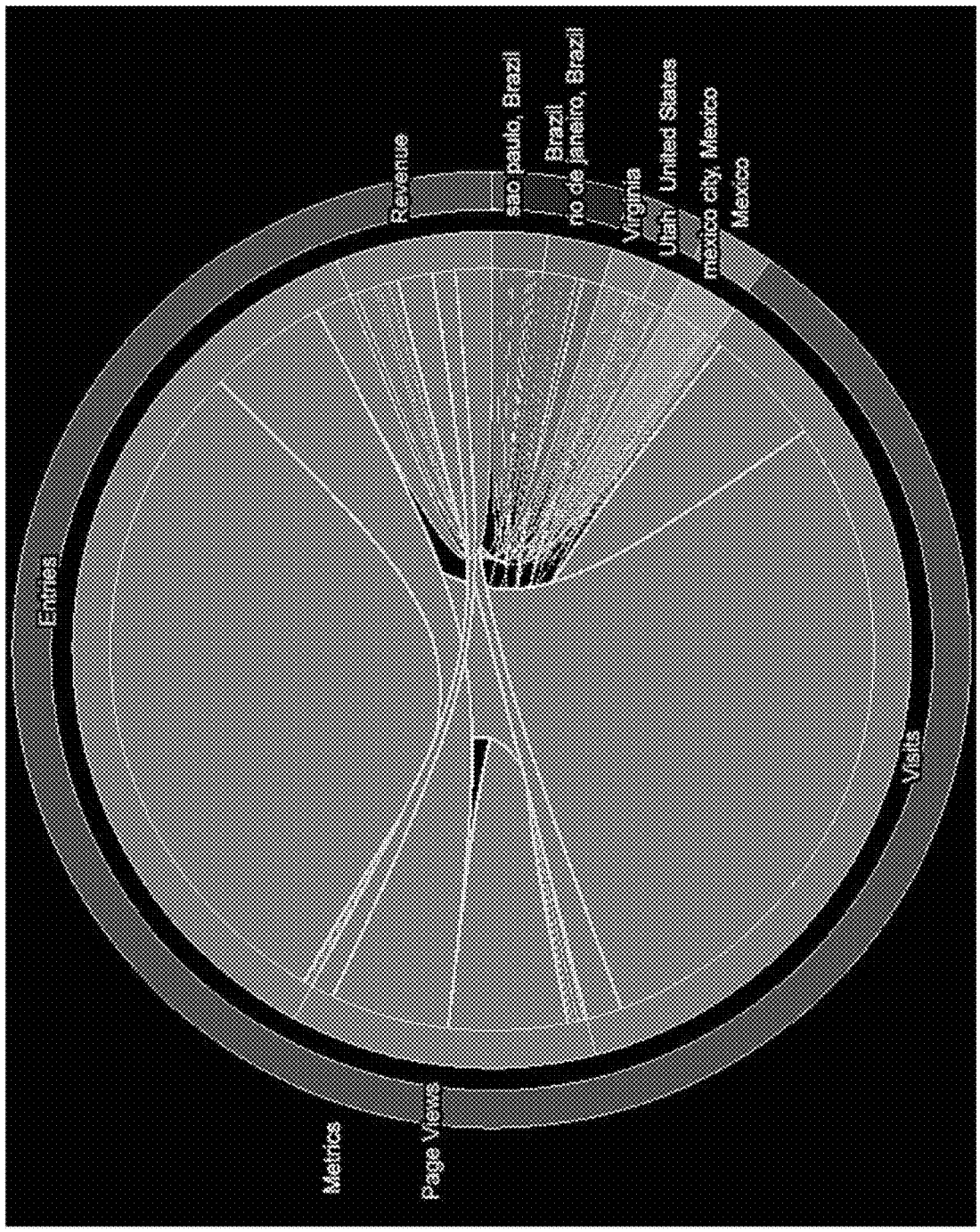
FIG. 9 is a diagram depicting an additional embodiment of a chord diagram that has been interactively modified by grouping multiple data variables into one grouping for the visualization.

FIGS. 7-9 depict additional examples of chord diagrams visualizing the analyzed data and depicting the strength of the associations between the data variables. As in FIGS. 4-6, the arc lengths provided to each of the parameters in the chord diagrams shown in FIGS. 7-9 is proportional to the sum of the association values with the other parameters. The width of the arc connecting to variables is proportional to the strength of association between them. FIGS. 7 and 8 depict the chord diagrams for a number of variables that an administrator has selected to review the associations for via administrator computing device 140. Both categorical variables and numeric variables are shown in the chord diagram in FIGS. 7 and 8. In FIG. 9, the administrator computing device 140 displays a chord diagram that has been interactively modified. Specifically, the administrator, via user interface on administrator computing device 140, grouped the parameters of Visits and Page Views under the category of "Metrics." This enables the administrator to modify the visualization to aid with their understanding of the collected and analyzed data.

With the pairwise associations, hierarchical clusters, and visualizations computed by data correlation engine 134, an administrator is able to build predictive models to predict which observed users 110 (or how many observed users 110) are statistically likely to perform certain actions with online service 120. For example, embodiments described herein enable an administrator to build a predictive model to predict which observed users 110 are statistically likely to complete an order or otherwise generate revenue at online service 120. A visualization depicting a grouping of data variables for geographic location of observed user 110, age of a observed user 110, and positive revenue generated per observed user 110 would indicate that there is a correlation between the location and age of the user with the likelihood of generating revenue from the user. The administrator may then build a predictive model and configure online service 120 to tailor the service for certain ages and geographic locations.

While the examples discussed above have focused on the field of data collection or web-browsing, the embodiments disclosed herein are not limited to web-browsing. For example, the features described herein can be applied to determining the relationships and relevancy of data collected from transportation infrastructure (e.g., data on the amount of passengers per airline, routes taken, transit times, etc.), data collected from medical device/biometric reading data (e.g., information on users' physiological statistics, demographic information, health symptoms, etc), and other fields.

Figure 10:
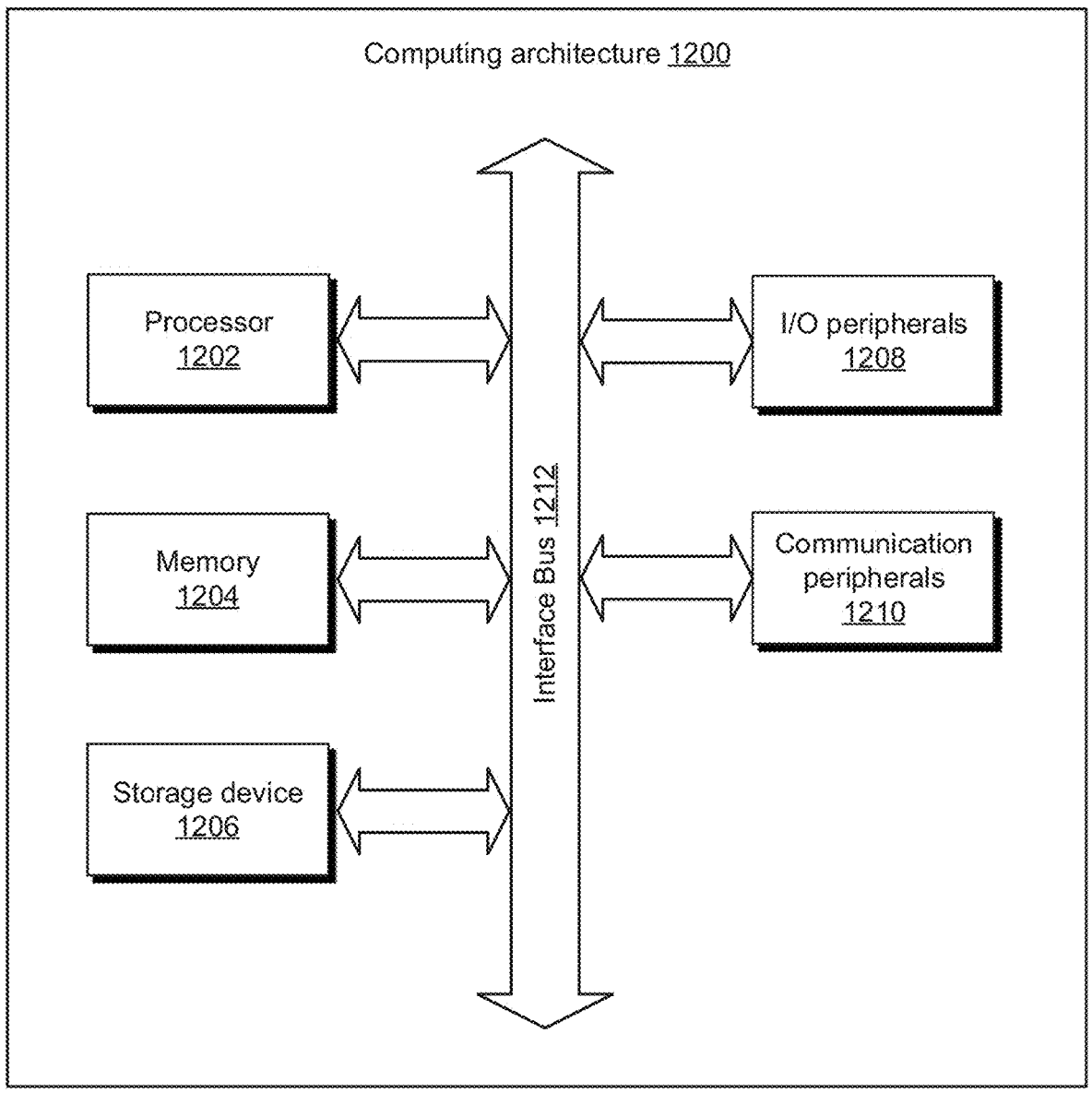
FIG. 10 is a block diagram depicting example hardware implementations for the components described in FIG. 1.

To implement the various features and functions described herein above, some or all elements of the computing devices and systems (e.g., computing devices 112A-112K and 140 and computing systems 124 and 132 of FIG. 1) are implemented using components of the computing architecture of FIG. 10. More particularly, FIG. 10 illustrates an example computing architecture 1200 for implementing the techniques in accordance with the present disclosure. In some embodiments, each of the DPUs 150a-k are implemented using the components of the computing architecture 1200 of FIG. 10.

The computing architecture 1200 include a processor 1202, a memory 1204, a storage device 1206, input/output peripherals 1208, communication peripherals 1210, and an interface bus 1212. The interface bus 1212 is configured to communicate, transmit, and transfer data, controls, and commands among the various components of the computing architecture 1200. The memory 1204 and the storage device 1206 comprise computer readable storage media, such as RAM, ROM, electrically erasable programmable read-only memory (EEPROM), hard-drives, CD-ROMs, optical storage devices, magnetic storage devices, electronic non-volatile computer storage, for example Flash® memory, and other tangible storage media and non-transitory computer readable mediums. Any of such computer readable storage media are configured to store instructions or program codes embodying aspects of the disclosure. The memory 1204 stores program code for an operating system, programs, and applications. The memory 1204 includes, for example, program code specifying instructions for the operation of data correlation engine 134. The processor 1202 is configured to execute the stored instructions and comprises, for example, a logical processing unit, a microprocessor, a digital signal processor, and other processors. Execution of the program code in memory 1204 by the processor 1202 provides the functionality described above.

The input and output peripherals 1208 include user interfaces such as a keyboard, screen, microphone, speaker, other input/output devices, and computing components such as graphical processing units, serial ports, parallel ports, universal serial bus, and other input/output peripherals. The input/output peripherals 1208 are connected to the processor 1202 through any of the ports coupled to the interface bus 1212. The communication peripherals 1210 are configured to facilitate communication between the computing architecture 1200 and other computing devices over a communications network and may include, for example, a network interface controller, modem, wireless and wired interface cards, antenna, and other communication peripherals.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

The invention claimed is:

1. A method for enhancing graphical visualizations in computer applications depicting multivariate relationships of electronic Internet analytics data, the electronic Internet analytics data collected from interactions on one or more websites, the method comprising:

receiving, from a network-based server, sets of electronic data collected from a plurality of observed users, the electronic data distributed across storage units in a distributed computing environment, wherein the electronic data includes a plurality of sets of continuous data and a plurality of sets of categorical data, wherein the distributed computing environment includes a plurality of distributed processing units;

converting the plurality of sets of continuous data to converted categorical data by performing operations comprising:

(a) in a first conversion phase executed by the distributed computing environment, determining a first bin and a second bin from an overall maximum value and an overall minimum value for the plurality of sets of continuous data, and (b) in a second conversion phase executed by the distributed computing environment, categorizing individual continuous data points included in the plurality of sets of continuous data by:

transmitting, from a master distributed processing unit to a first distributed processing unit and a second distributed processing unit, a query having a definition of the first bin and a definition of the second bin, receiving, in response to the query, a first vector from the first distributed processing unit and a second vector from the second distributed processing unit, the first vector having elements with values respectively representing numbers of data points from a first data set that are within the first bin and the second bin, the second vector having elements with values respectively representing data points from a second data set that are within the first bin and the second bin, wherein the first data set is stored at the first distributed processing unit and the second data set is stored at the second distributed processing unit, and computing, by the master distributed processing unit, the converted categorical data by aggregating the first vector and the second vector into a combined vector; and configuring a display device to display a graphical indication of pairwise relationships among data variables included in the converted categorical data and the categorical data.

2. The method of claim 1, wherein configuring the display device to display the graphical indication of the pairwise relationships among the data variables comprises:

determining a set of pairwise relationships between data variables included in the plurality of sets of categorical data and the converted categorical data by determining uncertainty coefficients between each of the data variables included in the plurality of sets of categorical data and the converted categorical data;

determining, from the set of pairwise relationships, groupings of the data variables included in the plurality of sets of categorical data and the converted categorical data by strength of associations between the data variables included in the plurality of sets of categorical data and the converted categorical data, and generating the graphical indication, wherein the graphical indication indicates strengths of relationships, respectively, between at least some of the data variables included in the plurality of sets of categorical data and the converted categorical data.

3. The method of claim 1, wherein the graphical indication of the pairwise relationships between the data variables includes a heatmap of a computational association matrix, wherein each cell in the computational association matrix indicates a strength of a correlation between two of the data variables, and wherein the cells in the computational association matrix are organized in one or more clusters of shaded regions, the one or more clusters indicating groups of the data variables having strong relationships with each other.

4. The method of claim 1, wherein the graphical indication of the relationships between the data variables includes a chord diagram depicting strengths of associations, respectively, between pairs of the data variables via thickness of connecting arcs.

5. The method of claim 1, wherein the electronic data collected from the plurality of observed users includes aggregated session-level data and individual-level data, wherein the session-level data includes a group of interactions with one or more of the data variables during single login sessions from the plurality of observed users and wherein the individual-level data includes a different group of interactions with one or more of the data variables during multiple login sessions from the plurality of observed users.

6. The method of claim 5, further comprising:
receiving a selection from a user interface specifying a combination of the session-level data and the individual-level data to use for aggregation.

7. The method of claim 1, further comprising:
reducing an amount of cardinality of the plurality of sets of categorical data and of the converted categorical data by grouping infrequently occurring data points into a separate category.

8. The method of claim 1, wherein the electronic data comprises Internet analytics data describing demographic information, location information, and Internet usage data collected from website interactions by the plurality of observed users.

9. The method of claim 1, wherein converting the plurality of sets of continuous data to the converted categorical data further comprises:

in the first conversion phase:
at the first distributed processing unit of the distributed computing environment, retrieving the first data set and computing a first maximum value from the first data set and a first minimum value from the first data set, at the second distributed processing unit of the distributed computing environment, retrieving the second data set and computing a second maximum value from the second data set and a second minimum value from the second data set, wherein the first minimum value and the second minimum value are different from each other and the first maximum value and the second maximum value are different from each other, transmitting, from the first distributed processing unit to the master distributed processing unit, the first minimum value and the first maximum value, transmitting, from the second distributed processing unit to the master distributed processing unit, the second minimum value and the second maximum value, computing, at the master distributed processing unit, the overall minimum value by applying a minimum-finding function to the first minimum value and the second minimum value, computing, at the master distributed processing unit, the overall maximum value by applying a maximum-finding function to the first maximum value and the second maximum value, computing, at the master distributed processing unit, the first bin from a combination of the overall minimum value and a difference between the overall maximum value and the overall minimum value that is scaled by a first weight, and computing, at the master distributed processing unit, the second bin from a combination of the overall minimum value and the difference that is scaled by a second weight; and in the second conversion phase executed by the distributed computing environment, categorizing the individual continuous data points by:

computing, by the first distributed processing unit, the first vector having the elements respectively representing the first bin and the second bin, computing, by the second distributed processing unit, the second vector having the elements respectively representing the first bin and the second bin, wherein the second vector is different from the first vector, and transmitting, from the first and second distributed processing units to the master distributed processing unit, the first and second vectors, respectively.

10. The method of claim 1, wherein determining the first bin and the second bin from the overall maximum value and the overall minimum value for the plurality of sets of continuous data comprises:

receiving, by the master distributed processing unit, (i) a first maximum value for the first dataset and a first minimum value for the first data set and (ii) a second maximum value for the second data set and a second minimum value for the second data set, wherein the first maximum value and the first minimum value are computed at the first distributed processing unit, wherein the second maximum value and the second minimum value are computed at the second distributed processing unit;

computing, at the master distributed processing unit, (i) the overall minimum value by applying a minimum-finding function to the first minimum value and the second minimum value and (ii) the overall maximum value by applying a maximum-finding function to the first maximum value and the second maximum value, and computing, at the master distributed processing unit, (i) the first bin from a combination of (a) the overall minimum value and (b) a difference between the overall maximum value and the overall minimum value that is scaled by a first weight and (ii) the second bin from a combination of (a) the overall minimum value and (b) a difference between the overall maximum value and the overall minimum value that is scaled by a second weight.

11. A system for enhancing graphical visualizations in computer applications depicting multivariate relationships of electronic Internet analytics data, the electronic Internet analytics data collected from interactions on one or more websites, the system comprising:

a processor; and a memory device communicatively coupled to the processor, wherein the processor is configured to execute instructions included in the memory device to perform operations comprising:

receiving, from a network-based server, sets of electronic data collected from a plurality of observed users, the electronic data distributed across storage units in a distributed computing environment, wherein the electronic data includes a plurality of sets of continuous data and a plurality of sets of categorical data, and wherein the distributed computing environment includes a plurality of distributed processing units;

converting the plurality of sets of continuous data to converted categorical data by performing operations comprising:

(a) in a first conversion phase executed by the distributed computing environment:

receiving, by a master distributed processing unit, (i) a first maximum value for a first data set and a first minimum value for the first data set and (ii) a second maximum value for a second data set and a second minimum value for the second data set, wherein the first maximum value and the first minimum value are computed at a first distributed processing unit and the second maximum value and the second minimum value are computed at a second distributed processing unit;

computing, at the master distributed processing unit, (i) an overall minimum value by applying a minimum-finding function to the first minimum value and the second minimum value and (ii) an overall maximum value by applying a maximum-finding function to the first maximum value and the second maximum value, computing, at the master distributed processing unit, a first bin from a combination of the overall minimum value and a difference between the overall maximum value and the overall minimum value that is scaled by a first weight and a second bin from a combination of the overall minimum value and a difference between the overall maximum value and the overall minimum value that is scaled by a second weight; and (b) in a second conversion phase executed by the distributed computing environment, categorizing individual continuous data points included in the plurality of sets of continuous data by:

transmitting, from the master distributed processing unit to the first distributed processing unit and the second distributed processing unit a query having a definition of the first bin and a definition of the second bin, receiving, in response to the query, a first vector from the first distributed processing unit and a second vector from the second distributed processing unit, the first vector having elements with values respectively representing numbers of data points from the first data set that are within the first bin and the second bin, the second vector having elements with values respectively representing numbers of data points from the second data set that are within the first bin and the second bins and computing, by the master distributed processing unit, the converted categorical data by aggregating the first vector and the second vector into a combined vector; and configuring a display device to display a graphical indication of pairwise relationships among data variables included in the converted categorical data and the categorical data.

12. The system of claim 11, wherein configuring the display device to display the graphical indication of the pairwise relationships among the data variables comprises:

determining a set of pairwise relationships between data variables included in the plurality of sets of categorical data and the converted categorical data;

determining, from the set of pairwise relationships, groupings of the data variables included in the plurality of sets of categorical data and the converted categorical data by strength of associations between the data variables included in the plurality of sets of categorical data and the converted categorical data; and generating the graphical indication, wherein the graphical indication indicates strengths of relationships, respectively, between at least some of the data variables included in the plurality of sets of categorical data and the converted categorical data.

13. The system of claim 11, wherein the graphical indication of pairwise relationships between the data variables includes one or more of:

a heatmap of a computational association matrix, wherein each cell in the computational association matrix indicates a strength of a correlation between two of the data variables, and wherein the cells in the computational association matrix are organized in one or more clusters of shaded regions, the one or more clusters indicating groups of the data variables having strong relationships with each other; and a chord diagram depicting strengths of associations, respectively, between pairs of the data variables via thickness of connecting arcs.

14. The system of claim 11, wherein the electronic data collected from the plurality of observed users includes aggregated session-level data and individual-level data, wherein the session-level data includes a group of interactions with one or more of the data variables during single login sessions from the plurality of observed users and wherein the individual-level data includes a different group of interactions with one or more of the data variables during multiple login sessions from the plurality of observed users.

15. The system of claim 14, wherein the processor is configured to execute instructions included in the memory device to perform operations further comprising:
receiving a selection from a user interface specifying a combination of the session-level data and the individual-level data to use for aggregation.

16. The system of claim 11, wherein the processor is configured to execute instructions included in the memory device to perform operations further comprising:
reducing an amount of cardinality of the plurality of sets of categorical data and of the converted categorical data by grouping infrequently occurring data points into a separate category.

17. The system of claim 11, wherein the electronic data comprises Internet analytics data describing demographic information, location information, and Internet usage data collected from website interactions by the plurality of observed users.

18. A non-transitory computer-readable medium with program code stored thereon, wherein the program code is executable to perform operations comprising:
receiving, from a network-based server, electronic data collected from a plurality of observed users, the electronic data including categorical data and continuous data and the electronic data stored across storage units in a distributed computing environment, and wherein the electronic data comprises Internet analytics data describing demographic information, location information, and Internet usage data collected from interactions on one or more websites by the plurality of observed users;
converting the continuous data to converted categorical data, by performing operations comprising:
(a) in a first conversion phase executed by the distributed computing environment, determining a first bin and a second bin from an overall maximum value and an overall minimum value for the plurality of sets of continuous data, and
(b) in a second conversion phase executed by the distributed computing environment, categorizing individual continuous data points included in the plurality of sets of continuous data by:
transmitting, from a master distributed processing unit to a first distributed processing unit and a second distributed processing unit, a query having a definition of the first bin and a definition of the second bin,
receiving, in response to the query, a first vector from the first distributed processing unit and a second vector from the second distributed processing unit, the first vector having elements with values respectively representing numbers of data points from a first data set that are within the first bin and the second bin, the second vector having elements with values respectively representing data points from a second data set that are within the first bin and the second bin, wherein the first data set is stored at the first distributed processing unit and the second data set is stored at the second distributed processing unit, and
computing, by the master distributed processing unit, the converted categorical data by aggregating the first vector and the second vector into a combined vector;
determining pairwise relationships between data variables included in the categorical data and the converted categorical data;
determining, from the pairwise relationships, groupings of the data variables included in the categorical data and the converted categorical data by strength of associations between the data variables; and
displaying a graphical indication of relationships between at least some of the data variables.

19. The non-transitory computer-readable medium of claim 18, wherein the graphical indication of relationships between the data variables includes a heatmap of a computational association matrix, wherein each cell in the computational association matrix indicates a strength of a correlation between two of the data variables, and wherein the cells in the computational association matrix are organized in one or more clusters of shaded regions, the one or more clusters indicating groups of the data variables having strong relationships with each other.

* * * * *